(12) United States Patent
Hsieh et al.

(10) Patent No.: US 7,778,329 B2
(45) Date of Patent: Aug. 17, 2010

(54) MODE DECISION SYSTEM AND METHOD FOR MOTION VECTOR FINE SEARCH

(75) Inventors: Pai-Chu Hsieh, Taipei (TW); Chien-Yu Lin, Sanchong (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1399 days.

(21) Appl. No.: 11/206,121

(22) Filed: Aug. 18, 2005

(65) Prior Publication Data

US 2006/0165177 A1    Jul. 27, 2006

(30) Foreign Application Priority Data

Jan. 27, 2005    (TW) ............................ 94102409 A (51) Int. Cl.
*H04N 7/12*    (2006.01)
(52) U.S. Cl. ............. 375/240.16; 375/240; 375/240.01; 375/240.12
(58) Field of Classification Search ................ 375/240, 375/240.01, 240.12, 240.16
See application file for complete search history.

(56) References Cited

U.S. PATENT DOCUMENTS 6,996,180 B2 *    2/2006    Kim et al. .............. 375/240.16

\* cited by examiner

*Primary Examiner*—Allen Wong
(74) *Attorney, Agent, or Firm*—Bacon & Thomas, PLLC (57) ABSTRACT

A mode decision system and method for motion vector fine search. Each macroblock in a frame has a pre-determined clock number. The system includes a first subtractor, an operation level generator and a determinator. The first subtractor has a first input terminal to receive a clock number and a second input terminal to receive the pre-determined clock number in order to subtract the clock number from the pre-determined clock number and accordingly generate a clock difference. The operation level generator is connected to the first subtractor in order to generate an operation level based on the clock difference. The determinator selects one or more modes in accordance with the operation level and accordingly performs the fine search on the macroblock.

21 Claims, 6 Drawing Sheets

FRAME Fn-1   CURRENT FRAME Fn

MODE DECISION SYSTEM AND METHOD FOR MOTION VECTOR FINE SEARCH

BACKGROUND OF THE INVENTION

1. Field of the Invention

The invention relates to the technical field of run-time image compression and, more particularly, to a mode decision system and method for motion vector fine search.

2. Description of Related Art

Figure 1:
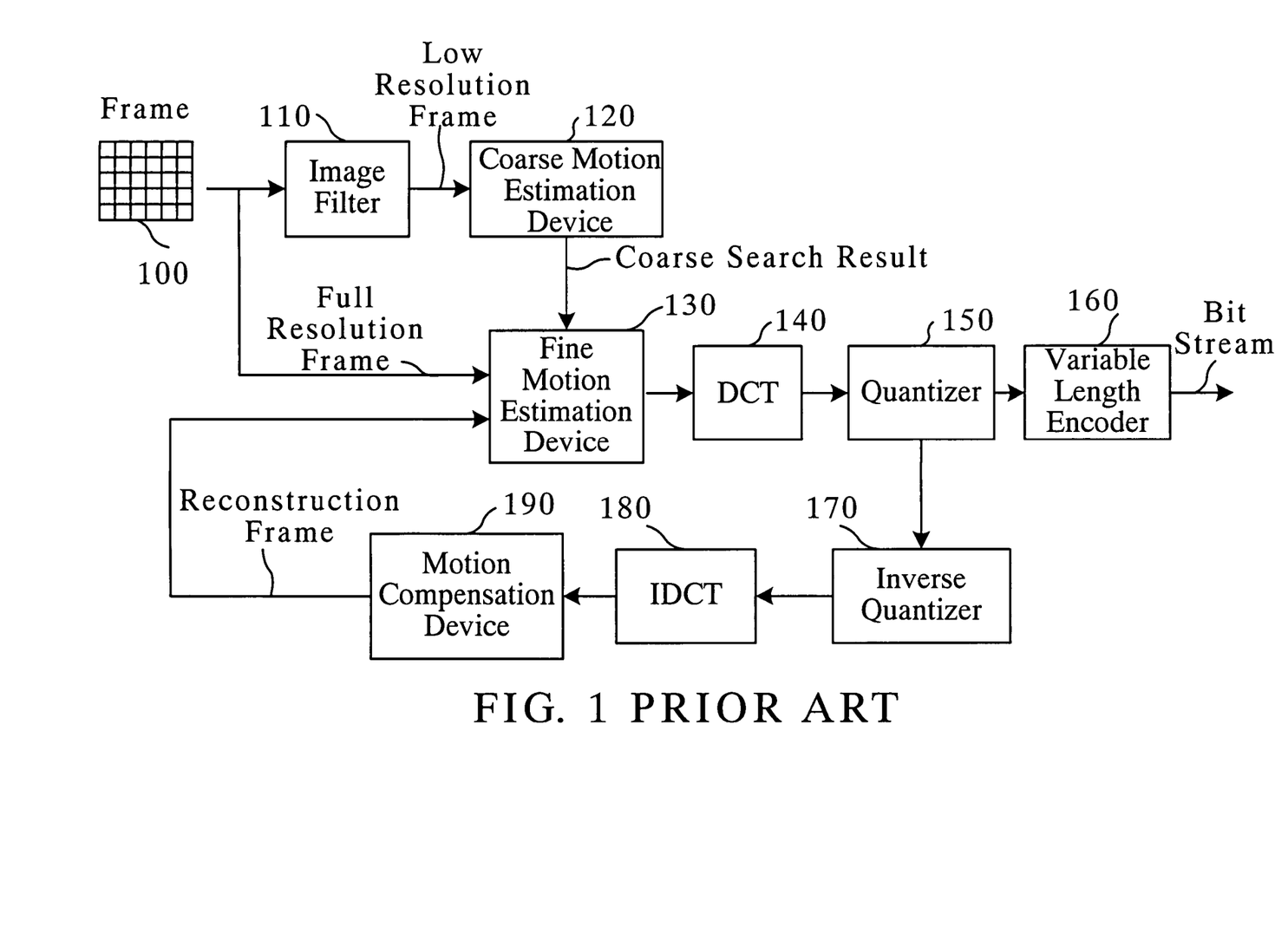
FIG. 1 is a block diagram of a typical MPEG encoder system using hierarchical dynamic search.

FIG. 1 is a block diagram of a typical MPEG encoder system using hierarchical dynamic search. The system includes an image filter 110, a coarse motion estimation device 120, a fine motion estimation device 130, a discrete cosine transform (DCT) device 140, a quantizer 150, a variable length encoder 160, an inverse quantizer 170, an inverse DCT (IDCT) device 180 and a motion compensation device 190.

A frame 100 passes through the image filter 110 to thus generate a low resolution frame. Next, the coarse motion estimation device 120 performs coarse search on the low resolution frame and sends the result to the fine motion estimation device 120 for further performing fine search on the frame 100 upon all modes, thereby finding a best dynamic search result. However, such a way requires much operation time to complete the fine search, and thus in an application of run-time image compression, the fine search may not be completed in a fixed time.

Therefore, it is desirable to provide an improved method and system to mitigate and/or obviate the aforementioned problems.

SUMMARY OF THE INVENTION

The object of the invention is to provide a mode decision system and method for motion vector fine search, which can avoid the prior problem that the fine search cannot be completed in a fixed time to obtain the run-time image compression and also save the operation time by eliminating search modes with worse results on the fine search performed by an encoder.

In accordance with one aspect of the present invention, there is provided a mode decision method for motion vector fine search, which determines one or more modes applied to perform a motion vector fine search on each macroblock in a frame. Each macroblock in the frame first performs a coarse search to thus obtain coarse frame forward cost, coarse frame backward cost, coarse field forward cost, coarse field backward cost. Each macroblock in the frame has a pre-determined clock number. The method includes: (A) inputting a clock number and the pre-determined clock number before a fine search is performed on a macroblock; (B) subtracting the clock number from the pre-determined clock number to thus obtain a clock difference for comparing with a threshold, thereby obtaining an operation level; and (C) selecting one or more modes based on the operation level, and accordingly performing the fine search on the macroblock.

In accordance with another aspect of the present invention, there is provided a mode decision system for motion vector fine search, which determines one or more modes applied to perform a motion vector fine search on each macroblock in a frame. Each macroblock in the frame has a pre-determined clock number. The system includes a first subtractor, an operation level generator and a determinator. The first subtractor has a first input terminal to receive a clock number and a second input terminal to receive the pre-determined clock number before a fine search is performed on a macroblock, thereby subtracting the clock number from the pre-determined clock number and generating a clock difference. The operation level generator is connected to the first subtractor in order to generate an operation level in accordance with the clock difference. The determinator selects one or more modes based on the operation level, and accordingly performs the fine search on the macroblock.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
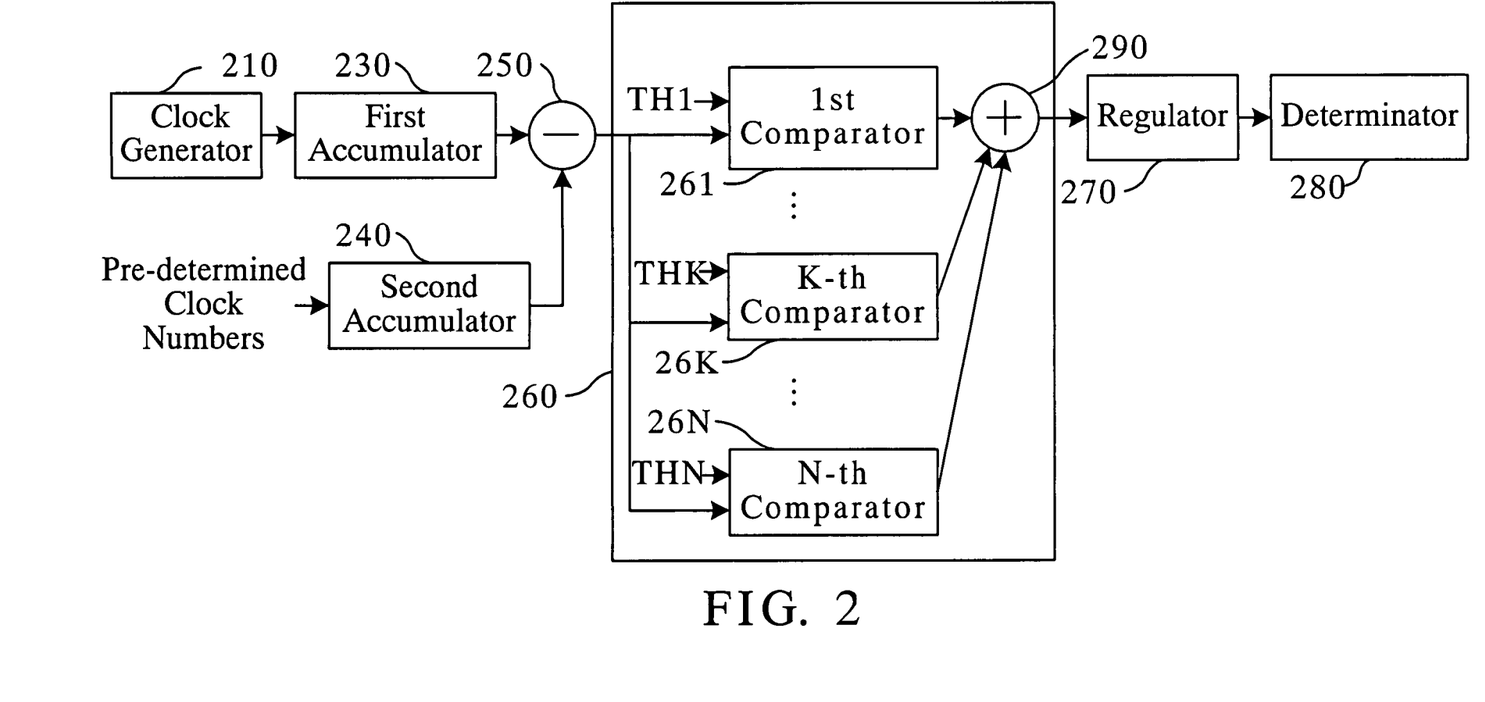
FIG. 2 is a block diagram of a mode decision system for motion vector fine search in accordance with the invention.

FIG. 2 is a block diagram of a mode decision system for motion vector fine search in accordance with the invention. The system determines one or more modes that applied to perform a motion vector fine search on a macroblock in a frame. The modes for performing the fine search on the macroblock includes an intra mode, a frame forward mode, a frame backward mode, a frame bi-direction mode, a field forward mode, a field backward mode and a field bi-direction mode. The macroblock first performs a coarse search to thus obtain a coarse frame forward cost, a coarse frame backward cost, a coarse field forward cost, a coarse field backward cost. Each macroblock in the frame is preset a pre-determined executable time, i.e., a pre-determined clock number. The system includes a clock generator 210, a first accumulator 230, a second accumulator 240, a first subtractor 250, an operation level generator 260, a regulator 270 and a determinator 280.

The clock generator 210 generates a clock sequence. A clock number represents the time that a macroblock performs the fine search. The first accumulator 230 has an input terminal to receive the clock sequence and accumulate the clocks, thereby outputting an accumulated clock number. The second accumulator 240 has an input terminal to receive and accumulate the pre-determined clock numbers of each macroblock, thereby outputting an accumulated pre-determined clock number. The first subtractor 250 has a first input terminal connected to an output terminal of the first accumulator 230 and a second input terminal connected to an output terminal of the second accumulator 240. The first subtractor 250 subtracts the accumulated clock number from the accumulated pre-determined clock number and accordingly generates a clock difference.

The operation level generator 260 is connected to the first subtractor 250 in order to generate an operation level based on the clock difference. The operation level generator 260 has N comparators 261 to 26N and an adder 290. Each comparator has a first input terminal connected to the first subtractor 250 to receive the clock difference and a second input terminal connected to a corresponding threshold TH1, ..., or THN. Accordingly, the K-th comparator 26K has a second input terminal connected to the K-th threshold THK, for $1 \leq K \leq N$ and K, N are integers. When the clock difference received is greater than the K-th threshold THK, the K-th comparator 26N outputs "1", and conversely "0". The adder 290 has N input terminals respectively connected to the output terminals of the comparators for obtaining the operation level by addition.

The regulator 270 is connected to the operation level generator 260 in order to regulate, i.e., increase or decrease the operation level in accordance with an image analysis of the frame and the macroblock. The determinator 280 is connected to the regulator 270 in order to select one or more modes in accordance with the regulated operation level and accordingly perform the fine search on the macroblock.

Figure 3A:
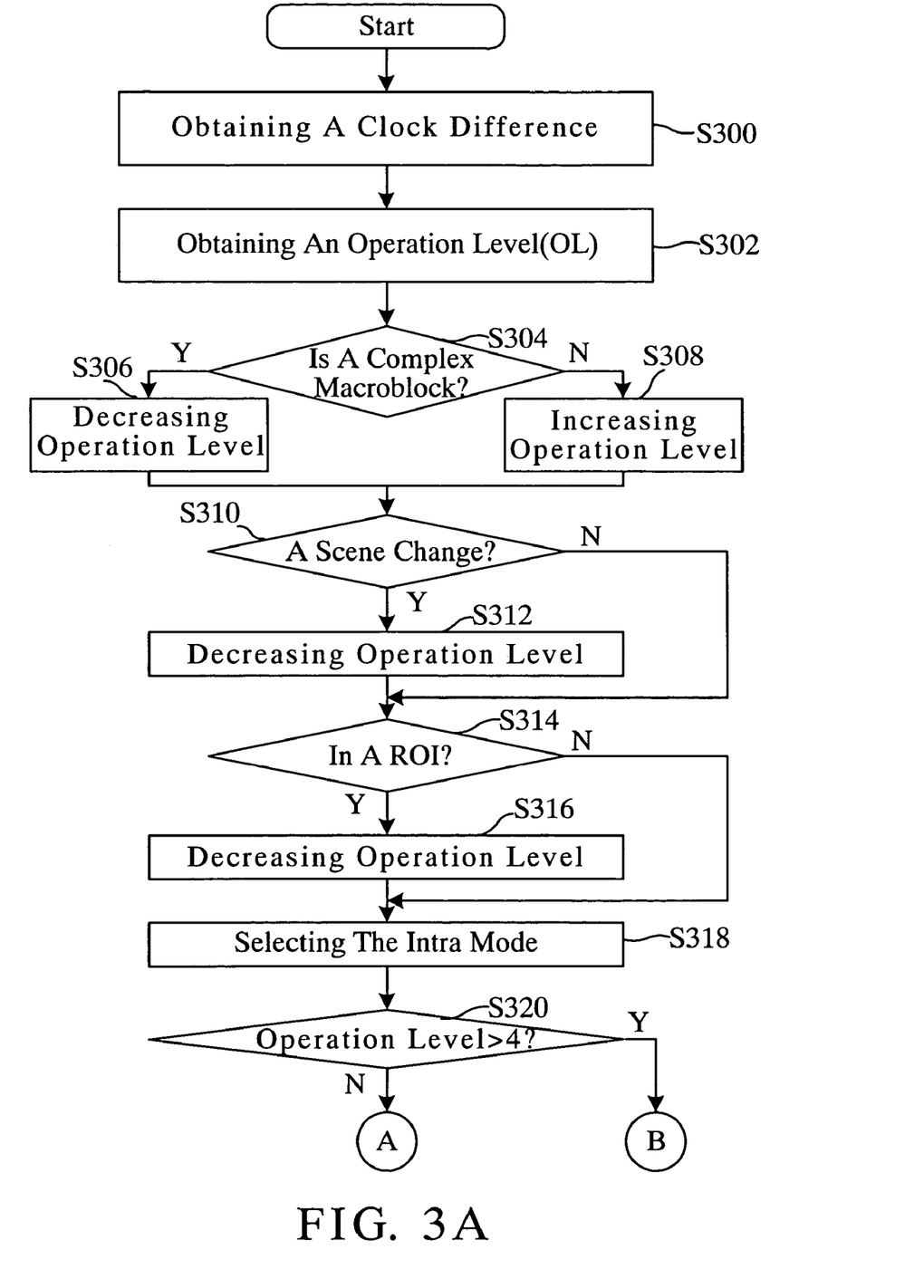
FIGS. 3A and 3B are flowcharts of a mode decision method for motion vector fine search in accordance with the invention.
Figure 3B:
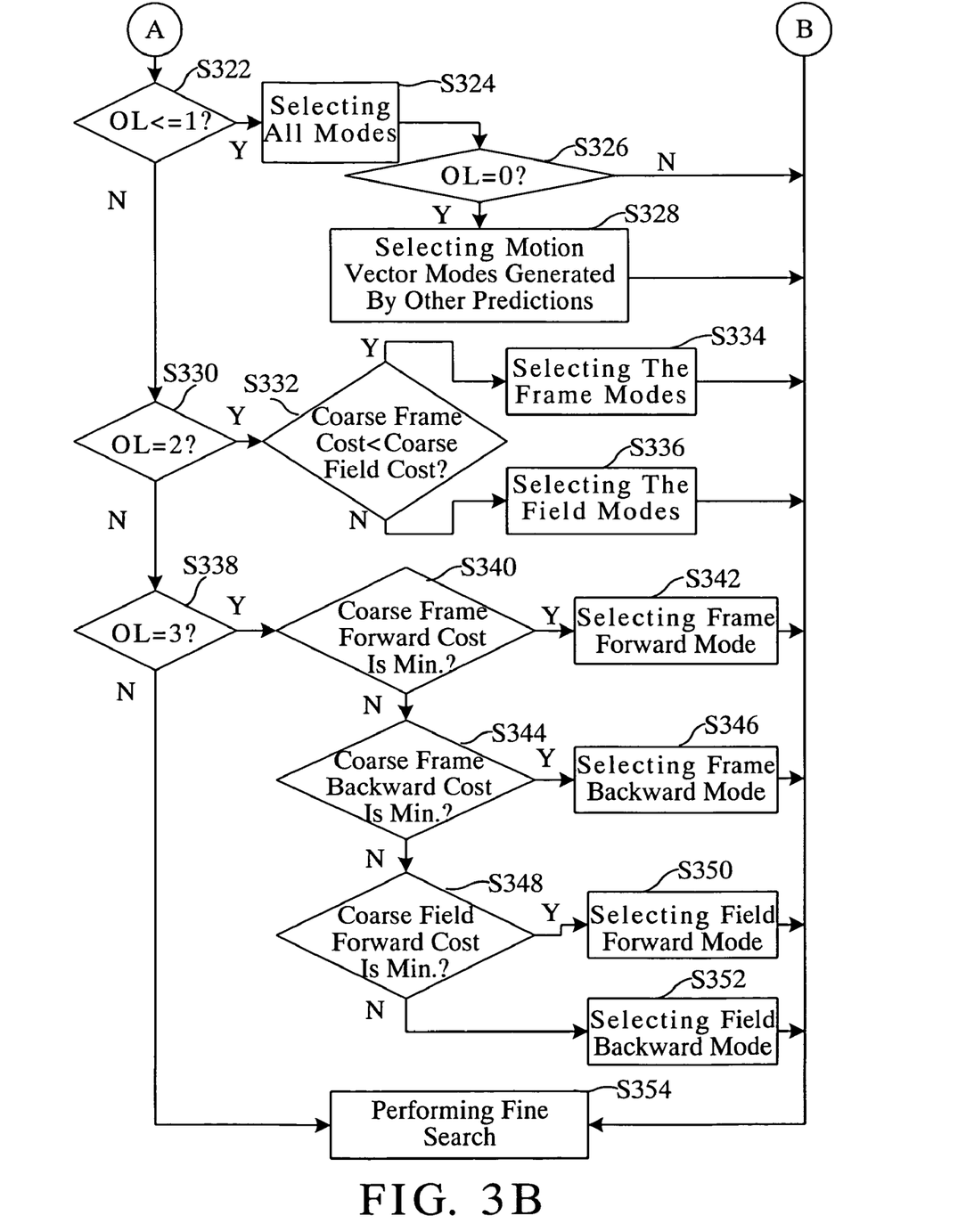

FIGS. 3A and 3B are flowcharts of a mode decision method of motion vector fine search in accordance with the invention. It determines one or more modes applied to perform a motion vector fine search on a macroblock in a frame. The modes for performing the fine search on the macroblock includes an intra mode, a frame forward mode, a frame backward mode, a frame bi-direction mode, a field forward mode, a field backward mode and a field bi-direction mode. The macroblock first performs a coarse search to thus obtain a coarse frame forward cost, a coarse frame backward cost, a coarse field forward cost, a coarse field backward cost. Each macroblock in the frame has a pre-determined clock number.

As shown in FIGS. 3A and 3B, step S300 accumulates a clock number generated from which a macroblock is performed by fine search, accumulates the pre-determined clock number of the macroblock, and subtracts the accumulated clock number from the accumulated pre-determined clock number to thus obtain a clock difference.

Step S302 compares the clock difference with at least one threshold to thus obtain an operation level. When the clock difference is greater than the K-th threshold THK, the K-th comparator 26N outputs "1". Conversely, when the clock difference is smaller than or equal to the K-th threshold THK, the K-th comparator 26N outputs "0", for $1 \leq K \leq N$ and K, N are integers. The adder 290 has N input terminals respectively connected to the output terminals of the comparators for obtaining the operation level (OL) by addition.

Figure 4:
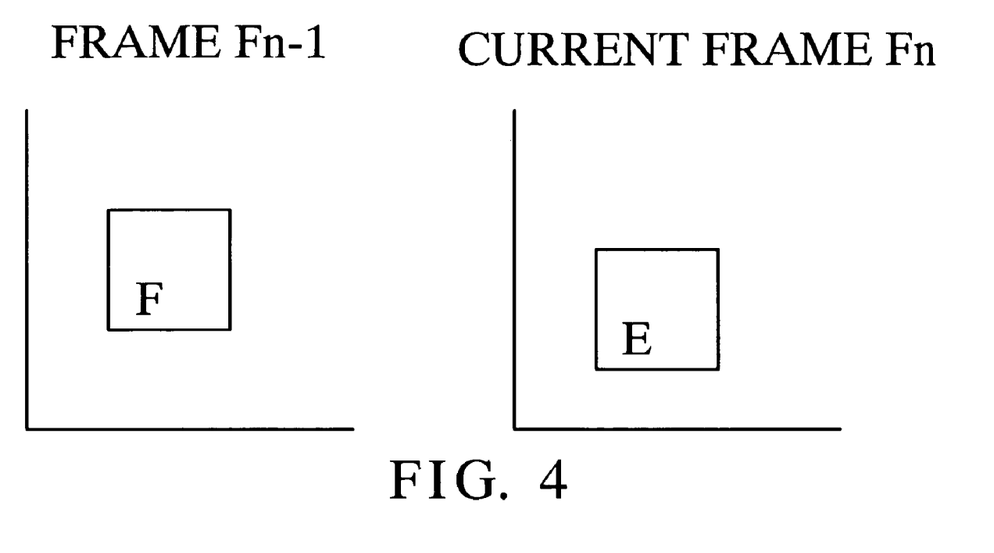
FIG. 4 is a schematic view of determining if a macroblock is a complex macroblock in accordance with the invention.

Step S304 determines if the macroblock is a complex macroblock. FIG. 4 is a schematic view of determining if a macroblock is a complex macroblock. As shown in FIG. 4, a macroblock E in a current frame is a macroblock to be determined, and a macroblock F in a previous frame is a corresponding macroblock to the macroblock E in the current frame. A difference is obtained by subtracting the macroblock E from the macroblock F, and the smaller the difference is, the simpler the macroblock E is. Namely, a complexity of the macroblock E is increased with the difference increase. Accordingly, in step S304, when the difference obtained by subtracting the macroblock E from the macroblock F is greater than a threshold, the macroblock E is determined as a complex macroblock and step S306 is executed to decrease the operation level. Conversely, when the macroblock E is not a complex macroblock and step S308 is executed to increase the operation level.

Step S310 determines if the frame appears a scene change; if yes, step S312 is executed to decrease the operation level; and if not, step S314 is executed to further determine if the macroblock locates in a region of interesting (ROI). Typically, a center of the frame is defined as the ROI due to the focus of a viewer. When the macroblock locates in the ROI, more encoding modes are selected to obtain a better image quality. When step S314 determines that the macroblock locates in the ROI, step S316 is executed to decrease the operation level, and conversely step S318 is executed.

Step S318 selects the intra mode. Step S320 determines if the operation level is greater than four (first setting). If the operation level is greater than four, it indicates insufficient time and thus step S354 is executed to apply the intra mode to perform the fine search. If the operation level is not greater than four, step S322 is executed to further determine if the operation level is smaller than or equal to one (second setting). If the operation level is smaller than or equal to one, step S324 is executed, and conversely step S330 is executed. Step S324 applies the intra mode, frame forward mode, frame backward mode, frame bi-direction mode, field forward mode, field backward mode and field bi-direction mode to perform the fine search. Step S326 further determines if the operation level equals zero (fifth setting); if yes, step S328 is executed to perform motion vector modes generated by other predictions.

Step S330 determines if the operation level equals two (third setting); if yes, step S332 is executed; and if not, step S338 is executed. Step S332 determines if a sum of the coarse frame forward cost and the coarse frame backward cost is smaller than a sum of the coarse field forward cost and the coarse field backward cost; if yes, step S334 is executed, and conversely step S336 is executed.

Step S334 performs the fine search on the macroblock using the intra mode, the frame forward mode, the frame backward mode and the frame bi-direction mode since the coarse frame costs are smaller than the coarse field costs. Step S336 performs the fine search on the macroblock using the intra mode, the field forward mode, the field backward mode and the field bi-direction mode.

Step S338 determines if the operation level equals three (fourth setting); if yes, step S340 is executed; and if not, step S354 is executed. Step S340 determines if the coarse frame forward cost is the minimum; if yes, step S342 is executed; and if not, step S344 is executed. Since the coarse frame forward cost is the minimum, step S342 applies the intra mode and frame forward mode to perform the fine search on the macroblock.

Step S344 determines if the coarse frame backward cost is the minimum; if yes, step S346 is executed; and if not, step S348 is executed. Since the coarse frame backward cost is the minimum, step S346 applies the intra mode and frame backward mode to perform the fine search on the macroblock.

Step S348 determines if the coarse field forward cost is the minimum; if yes, step S350 is executed; and if not, step S352 is executed. Since the coarse field forward cost is the minimum, step S350 applies the intra mode and field forward mode to perform the fine search on the macroblock. Step S352 applies the intra mode and field backward mode to perform the fine search on the macroblock.

Figure 5:
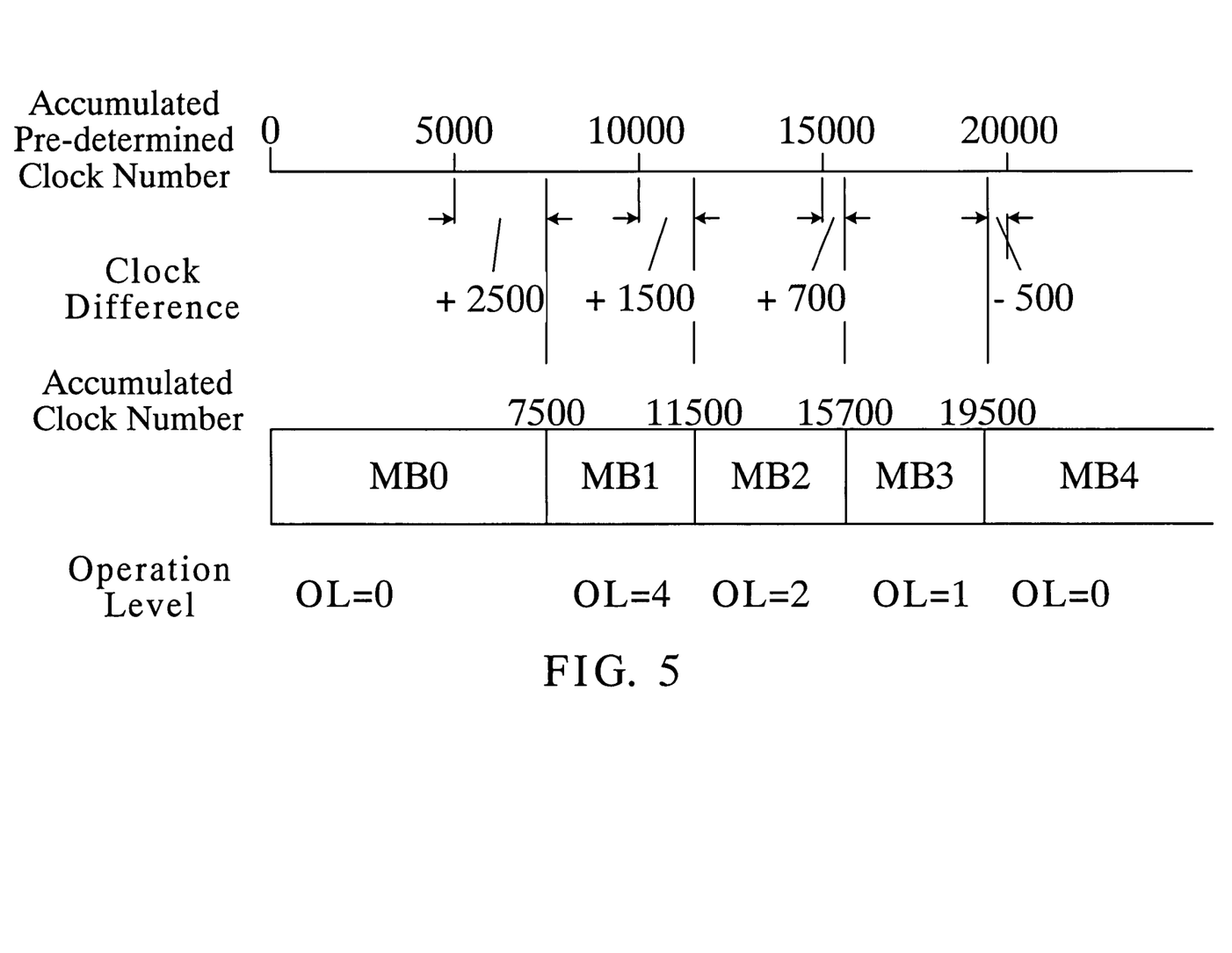
FIG. 5 is a schematic view of an operation in accordance with the invention.

FIG. 5 is a schematic view of an operation in accordance with the invention, wherein each macroblock has a pre-determined clock number of 5000 clocks and the comparators 260-264 have a threshold of 500, 1000, 1500 and 2000 respectively. At the start, the accumulated clock number is zero such that the comparators 260-264 output zero and the adder 290 outputs zero. Accordingly, the operation level is zero so as to perform the fine search on the macroblock MB0 using the intra mode, frame forward mode, frame backward mode, frame bi-direction mode, field forward mode, field backward mode and field bi-direction mode, and also to perform motion vector modes generated by other predictions.

After the macroblock MB0 is performed completely, the accumulated clock number is 7500 and the accumulated pre-determined clock number is 5000. In this case, the clock difference is 2500, the comparators 261-264 output one, and the output of the adder 290 is four. Accordingly, the operation level is four so as to perform the fine search on the macroblock MB1 using the intra mode.

After the macroblock MB1 is performed completely, the accumulated clock number is 11500 and the accumulated pre-determined clock number is 10000. In this case, the clock difference is 1500, the comparators 261, 262 output one and the comparators 263, 264 output zero, and the adder 290 outputs two. Accordingly, the operation level is two, and the intra mode, frame forward mode, frame backward mode and frame bi-direction mode are applied to perform the fine search on the macroblock MB2 if the coarse frame costs are smaller than the coarse field costs, and otherwise, the intra mode, field forward mode, field backward mode and field bi-direction mode are applied. The remaining macroblocks are processed the same.

As shown in FIG. 5, when the practical run-time of a macroblock exceeds the pre-determined time, the run-time of a next macroblock is reduced by regulating the operation level to accordingly reduce a number of the modes performed, thereby controlling the total run time of a whole image. The operation level is generated in accordance with the accumulated clock number and pre-determined clock number. Besides, the operation level can be generated directly by a run-time clock number of performing the fine search on a macroblock and the pre-determined clock number of the macroblock.

As cited, upon the time measure mechanism in conjunction with hierarchical dynamic search, the full resolution fine search in the MPEG encoder can selectively apply one or more modes to perform the fine search on a macroblock in accordance with the executable or pre-determined time of the macroblock and the result of performing coarse search on the macroblock, thereby eliminating the worse search modes to accordingly control the run-time of encoding.

Although the present invention has been explained in relation to its preferred embodiment, it is to be understood that many other possible modifications and variations can be made without departing from the spirit and scope of the invention as hereinafter claimed.

What is claimed is:

1. A mode decision method for motion vector fine search, which determines one or more modes applied to perform a motion vector fine search on each macroblock in a frame, each macroblock in the frame first performing a coarse search to thus obtain a coarse frame forward cost, a coarse frame backward cost, a coarse field forward cost, a coarse field backward cost, each macroblock in the frame having a pre-determined clock number, the method comprising:
    (A) inputting a clock number and the pre-determined clock number before a fine search is performed on a macroblock;
    (B) subtracting the clock number from the pre-determined clock number to thus obtain a clock difference for comparing with a threshold, thereby obtaining an operation level; and
    (C) selecting one or more modes based on the operation level, and accordingly performing the fine search on the macroblock.

2. The method as claimed in claim 1, wherein in step (A), the clock number is an accumulated clock number obtained by accumulating run-time of macroblocks in the frame that are performed by fine search.

3. The method as claimed in claim 2, wherein in step (A), the pre-determined clock number is an accumulated pre-determined clock number obtained by accumulating all pre-determined clock numbers of the macroblocks.

4. The method as claimed in claim 1, wherein the step (B) further comprises:
    (B1) increasing or decreasing the operation level in accordance with an image analysis of the frame and the macroblock.

5. The method as claimed in claim 4, wherein the step (B1) further comprises:
    (B11) determining if the macroblock is a complex macroblock;
    (B12) increasing the operation level if the macroblock is the complex macroblock; and
    (B13) decreasing the operation level if the macroblock is not the complex macroblock.

6. The method as claimed in claim 4, wherein the step (B1) further comprises:
    (B14) determining if the frame appears a scene change; and
    (B15) decreasing the operation level if the frame appears the scene change.

7. The method as claimed in claim 4, wherein the step (B1) further comprises:
    (B16) determining if the macroblock locates in a region of interesting; and
    (B17) decreasing the operation level if the macroblock locates in the region of interesting.

8. The method as claimed in claim 1, wherein the modes includes an intra mode, a frame forward mode, a frame backward mode, a frame bi-direction mode, a field forward mode, a field backward mode and field bi-direction mode, and the step (C) further comprises:
    (C1) selecting the intra mode, and determining if the operation level is greater than a first setting; and
    (C2) applying the intra mode to perform the fine search on the macroblock if the operation level is greater than the first setting.

9. The method as claimed in claim 8, wherein the step (C) further comprises:
    (C3) determining if the operation level is smaller than or equal to a second setting; and
    (C4) applying the intra mode, the frame forward mode, the frame backward mode, the frame bi-direction mode, the field forward mode, the field backward mode and the field bi-direction mode to perform the fine search on the macroblock.

10. The method as claimed in claim 8, wherein the step (C) further comprises:
    (C5) determining if the operation level equals a third setting;
    (C6) if the step (C5) determines that the operation level equals the third setting, further determining if a sum of the coarse frame forward cost and coarse frame backward cost is smaller than a sum of the coarse field forward cost and coarse field backward cost; and
    (C7) if the step (C6) determines that the sum of the coarse frame forward cost and coarse frame backward cost is smaller than the sum of the coarse field forward cost and coarse field backward cost, applying the intra mode, the frame forward mode, the frame backward mode and the frame bi-direction mode to perform the fine search on the macroblock.

11. The method as claimed in claim 10, wherein the step (C) further comprises:
    (C8) if the step (C6) determines that the sum of the coarse frame forward cost and coarse frame backward cost is not smaller than the sum of the coarse field forward cost and coarse field backward cost, applying the intra mode, the field forward mode, the field backward mode and the field bi-direction mode to perform the fine search on the macroblock.

12. The method as claimed in claim 8, wherein the step (C) further comprises:
(C9) determining if the operation level equals a fourth setting;
(C10) if the step (C9) determines that the operation level equals the fourth setting, further determining if the coarse frame forward cost is the smallest one; and
(C11) if the step (C10) determines that the coarse frame forward cost is the smallest one, applying the intra mode and the frame forward mode to perform the fine search on the macroblock.

13. The method as claimed in claim 12, wherein the step (C) further comprises:
(C12) if the step (C10) determines that the coarse frame forward cost is not the smallest one, further determining if the coarse frame backward cost is the smallest one; and
(C13) if the step (C12) determines that the coarse frame backward cost is the smallest one, applying the intra mode and the frame backward mode to perform the fine search on the macroblock.

14. The method as claimed in claim 13, wherein the step (C) further comprises:
(C14) if the step (C12) determines that the coarse frame backward cost is not the smallest one, further determining if the coarse field forward cost is the smallest one; and
(C15) if the step (C14) determines that the coarse field forward cost is the smallest one, applying the intra mode and the field forward mode to perform the fine search on the macroblock.

15. The method as claimed in claim 14, wherein the step (C) further comprises:
(C16) if the step (C14) determines that the coarse field forward cost is not the smallest one, applying the intra mode and the field backward mode to perform the fine search on the macroblock.

16. A mode decision system for motion vector fine search, which determines one or more modes applied to perform a motion vector fine search on each macroblock in a frame, each macroblock in the frame having a pre-determined clock number, the system comprising:
a first subtractor, which has a first input terminal to receive a clock number and a second input terminal to receive the pre-determined clock number before a fine search is performed on a macroblock, thereby subtracting the clock number from the pre-determined clock number and generating a clock difference;
an operation level generator, which is connected to the first subtractor in order to generate an operation level based on the clock difference; and
a determinator, which selects one or more modes in accordance with the operation level and accordingly performs the fine search on the macroblock.

17. The system as claimed in claim 16, further comprising a clock generator, which generates a run-time clock of the macroblock.

18. The system as claimed in claim 17, further comprising a first accumulator, which is connected to the clock generator for receiving the run-time clock of the macroblock for accumulation to generate the clock number received by the first input terminal of the first subtractor.

19. The system as claimed in claim 16, further comprising a second accumulator, which receives a respective pre-determined clock number of the macroblock for accumulation to generate the pre-determined clock number received by the second input terminal of the first subtractor.

20. The system as claimed in claim 16, wherein the operation level generator further comprises:
N comparators, each having a first input terminal connected to the first subtractor to receive the clock difference and a second input terminal connected to a corresponding threshold, such that when the clock difference is greater than a K-th threshold received by a second input terminal of a K-th comparator, the K-th comparator outputs one; and when the clock difference is smaller than or equal to the K-th threshold, the K-th comparator outputs zero, for $1 \leq K \leq N$ and K, N are integers; and
an adder having N input terminals respectively connected to the N comparators for addition to accordingly obtain the operation level.

21. The system as claimed in claim 20, wherein the operation level generator further comprises a regulator, which increases or decreases the operation level in accordance with an image analysis of the frame and the macroblock.

* * * * *